Dec. 12, 1967     D. A. SKINNER     3,357,541

CONVEYOR

Filed Sept. 30, 1966     2 Sheets-Sheet 1

INVENTOR.
Donald A. Skinner
BY
Raymond N. Matson
his PATENT AGENT

Dec. 12, 1967  D. A. SKINNER  3,357,541
CONVEYOR
Filed Sept. 30, 1966  2 Sheets-Sheet 2

INVENTOR.
Donald A. Skinner
BY
Raymond N. Matson
his PATENT AGENT

United States Patent Office 3,357,541
Patented Dec. 12, 1967

3,357,541
CONVEYOR
Donald A. Skinner, Old State Road,
Binghamton, N.Y. 13904
Filed Sept. 30, 1966, Ser. No. 583,345
5 Claims. (Cl. 198—88)

ABSTRACT OF THE DISCLOSURE

A conveyor having a plurality of pivotally connected sections for loading, elevating, changing the direction of, and discharging bales of hay, etc., the sections having bale guiding and retaining means and special conveyor chain flights arrangements and guides, and each pair of sections having power means.

This invention relates generally to conveyors and more particularly to a plural-section conveyor which will convey bales of hay, etc., bagged material, etc. from a loading section on the ground, up a steep elevator section, and around an arcuate section through the open door of a barn or other storage area to a straight discharge section.

Conveyors of this general type are known in the art but as a whole are characterized by a number of objectionable features. Among these are: an inability to move bales, etc. from a loading table up a steep incline and around a curve without the bale falling off or becoming jammed; a heavy impractical structural design involving unnecessary cost, a cumbersomeness in use, and excessive power requirements; and a lack of flexibility in their applications.

Accordingly, the main object of the present invention is to provide an improved conveyor for bales, etc. which will obviate the above and other objectionable features characterizing known conveyor structures.

An important object of the present invention is to provide an improved conveyor which will successively elevate bales up a steep incline while preventing them from falling backwardly, and will transfer them smoothly to connected curved and horizontal sections.

Another important object of the present invention is to provide an improved elevating conveyor having a loading section pivotally connected thereto so as to enable adjustment of the angle between the two or the upward pivoting of the loading section so as to enable a wagon or hauling unit to pass by.

A further important object of the present invention is to provide an improved conveyor having a plurality of sections pivotally connected together for relative movement about a horizontal axis for ease in placement and in which the conveyor chains are continuous between sections and permit such pivoting or relative movement.

A still further important object of the present invention is to provide an improved conveyor of simple and practical construction which will be of low initial cost and maintenance and of long life in use and which employs a novel bale elevating principle wherein the bale rests between the conveyor chains and between the connecting flights to enable the use of a shorter conveyor at a steeper incline.

Other objects and advantages of the invention will become apparent during the course of the following description.

In the drawings, one embodiment of the invention is shown. In this showing:

Figure 1:
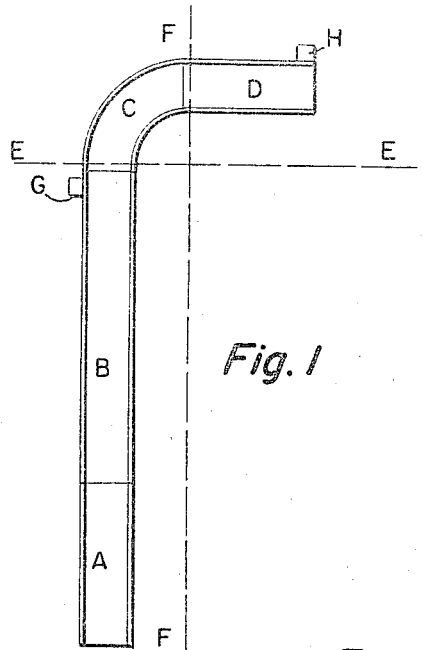
FIGURE 1 is a schematic plan view of the conveyor showing its optional positioning with respect to a barn or other storage area.
Figure 4:
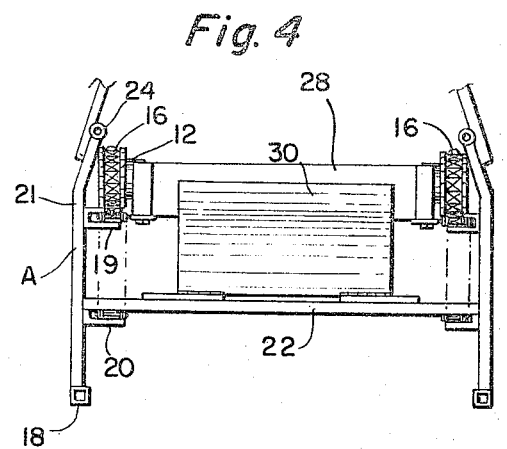
FIGURE 4 is a right end elevational view thereof with the lower end details of elevating section B being omitted for clarity.

Referring to the drawings, the conveyor comprises a plurality of sections illustrated herein as A, B, C and D respectively pivotally connected together for relative movement about a horizontal axis as desired at drive sprockets 12, 13 and 14. Depending upon the available space outside of or within a barn or other storage space area, the sections A and B of the conveyor may readily be arranged at right angles to the front wall EE of a barn as indicated in FIGURE 1 with the sections CD extending within an open door, etc. thereof, or parallel to the front wall thereof as indicated by front wall dotted lines FF. In either case, the upper end of the elevating conveyor section B would be supported by the outer end of the section C which, with section D is securely positioned as required within the barn, etc.

The bales, etc. are moved by the conveyor-chain-mounted flights from the loading table section A to the discharge section D and, due to the pivoting of the sections at the specified sprockets, this may be effected by a single continuous chain and a single source of power. However, for a maximum of flexibility in use the sections A and B have been provided with a single spaced pair of continuous chains 16 having a source of power G while the conveyor sections C and D have a separate source of power H (FIGURE 1). This enables the operation of the loading and elevating conveyor sections A and B at a different speed from the arcuate and discharge sections C and D and is important depending upon the available manpower in attendance at the loading and discharge sections A and D.

The loading table conveyor section A comprises spaced, parallel, longitudinally extending frame members 18 and upper and lower, inwardly opening chain guide channels 19 and 20 arranged thereover and connected by longitudinally spaced, vertically extending, resilient rods 21 which support bale guide rails 24, all of which are transversely connected into a rigid frame structure by lateral members 22 and the shafts of sprockets 12 and 23, the latter being adjustable by screws 25 to regulate the tension of the laterally spaced chains 16. The frame members 22 support laterally spaced, longitudinally extending floor members 26 of wood or steel which comprise the conveyor section bottom which is at a lower elevation than the power run of the chain in its guide channel 19.

A plurality of transversely disposed flights 28 span and are rigidly connected to the links of the chains 16 so as to be normal thereto and are longitudinally spaced at a distance greater than the width of a standard bale of hay, etc. so that in conveyor section A and in each of the other sections, the conveyed bale rests upon the bottom of the section between the chains 16 and between the flights 28 which engage the bales at a point or line intermediate height and about their center of gravity. This is an important feature of the invention as it enables the elevating conveyor section B to be set at a steeper inclination than the conventional 30° angle without the bales tumbling backwardly which, of course, reduces its required length and cost for a given elevation.

Figure 2:
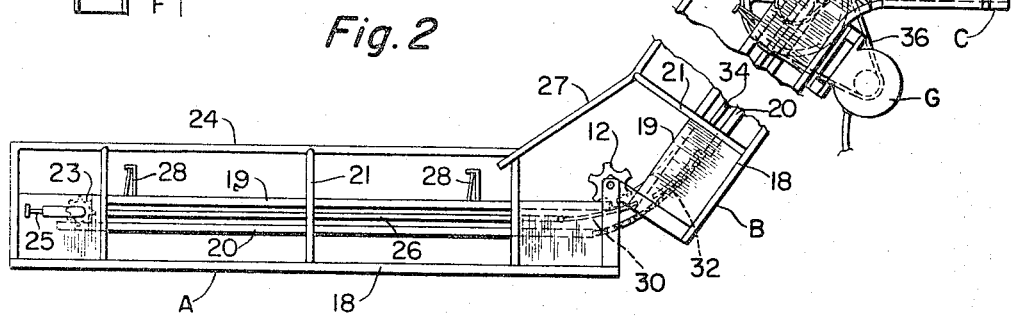
FIGURE 2 is a fragmentary side elevational view thereof to an enlarged scale.
Figure 3:
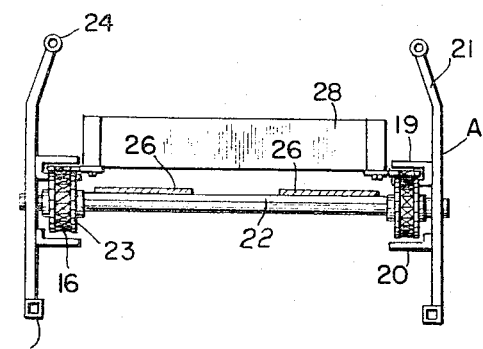
FIGURE 3 is an end elevational view of the loading table section A to a further enlarged scale, looking from the left in FIGURE 2.
Figure 5:
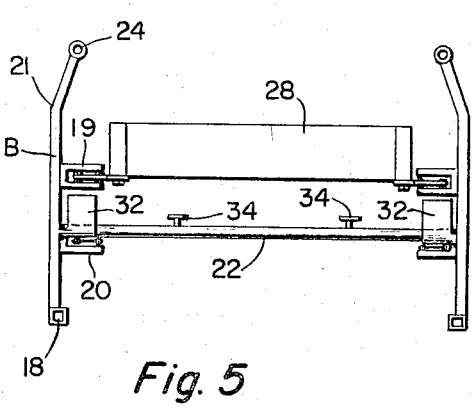
FIGURE 5 is a lower end elevational view of the elevating section B with the right end details of section A being omitted for clarity.

The elevating section B (FIGURES 2 and 5) is constructed similarly to the loading section A just described (similar parts bear similar numerals) from which bales are smoothly transferred to the inclined section B by means of a plate 30 hinged to the conveyor section bottom 26 and which spans the open space between the relatively inclined sections as do the bales guide rail extensions 27 on section B. It is to be noted that the power run of the chains 16 passes under the idler sprocket 12 and that a wear plate 32 but no sprocket is provided at that point for the return runs which merely pass from the lower guide channels over the wear plates 32 to the lower guide channels in the conveyor section A. This is also an important feature of the invention because despite the continuous chains of the two pivoted sections, it enables the loading table section A to be pivoted to any desired angle with respect to the elevating section B so as to be accommodated to the slope of the ground or to be vertically elevated to permit the passage of a farm vehicle, etc.

The elevating conveyor section B differs further from the section A in that the bottom of the section comprises a pair of spaced, longitudinally extending rails 34 instead of the boards 26 which latter are required for the indiscriminate dumping of bales on the loading table. The chains 16 are driven as stated by the chain sprockets 13 which are driven by a belt or chain 36 from the motor G which is mounted on the upper portion of the section B which is suitably connected for pivotal movement about the center of sprockets 13 to section C extension brackets 38.

The bale guide rails 24 resiliently engage the ends of the bales at a point or line about two thirds of their height and being inwardly inclined, exert a downward holding or restraining force on the bales as they are elevated by the flights. Most balers form bales of standard dimensions but if smaller bales should have to be elevated, the guide-rail-supporting rods 21 are bent so as to incline inwardly further.

The conveyor section C is arcuate in shape and includes a spaced pair of parallel, inner and outer side walls 40, 41 connected by a solid arcuate bottom 44 as by welding which terminates at each end in downwardly curved aprons 46, 48 over the sprocket shafts of the idler chain sprockets 50 and the drive sprockets 52. The aprons are cut away adjacent the sprockets as at 54 so as to permit the chains 56 from the sprockets 50 to pass along the surface of the bottom 44 and to pass over the sprockets 52 and return beneath the bottom 44.

The inner arcuate wall 40 functions as a guide and wear plate for the inner chain 56 and the outer chain is maintained in proper spaced relation therewith by the longitudinally spaced flights 58 which move along the upper surface of the solid bottom 44. On return, the inner chain is supported by an angle 59 fixed to the inner face of the wall 40 and the outer chain is loosely supported by the flights.

It will be noted that the outer sprockets are larger than the inner sprockets to compensate for the curvature of section C. In the example shown, the outer sprockets have 12 teeth each and the inner sprockets have 7 each. Correspondingly the flights 48 are connected to each sixth link of the inner chain and to each eleventh link of the outer chain. The inner and outer sprockets being identical, the arcuate conveyor section C may be driven in either direction but the power unit must be at the discharge end so that the drive is on the top chains, not the return. The drive sprockets 52 are therefore driven from the idler sprocket 14 of conveyor section D by means of a chain 60 so as to be driven by the source of power H.

Figure 6:
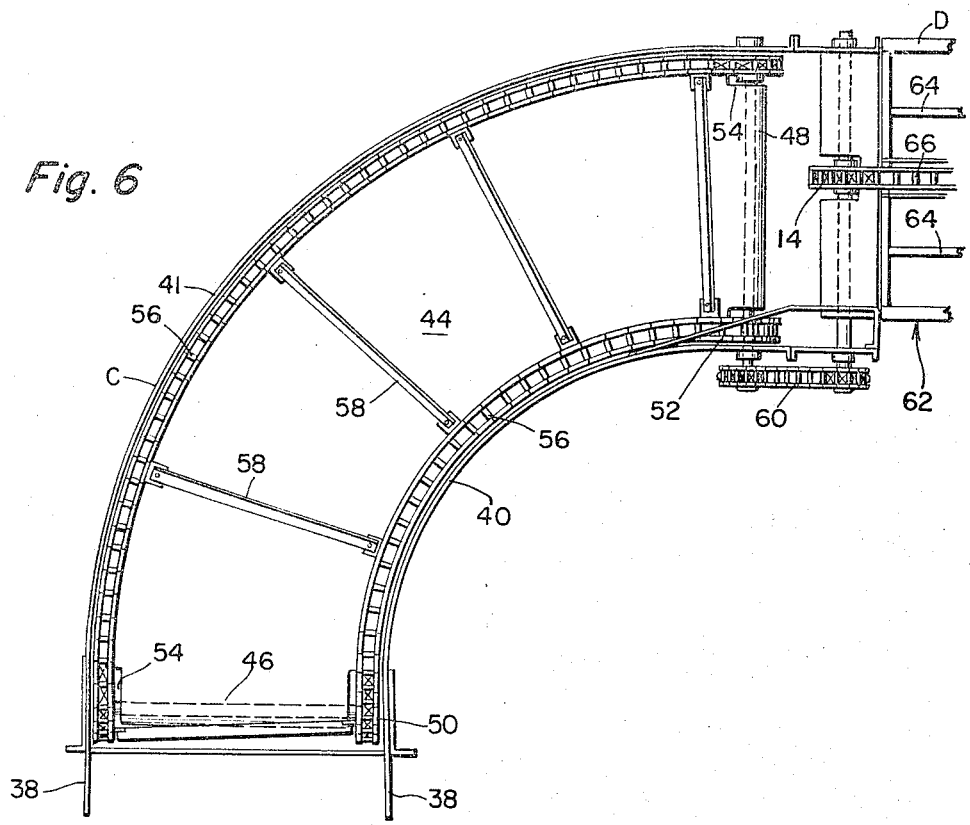
FIGURE 6 is a fragmentary top plan view of arcuate section C and straight section D.
Figure 7:
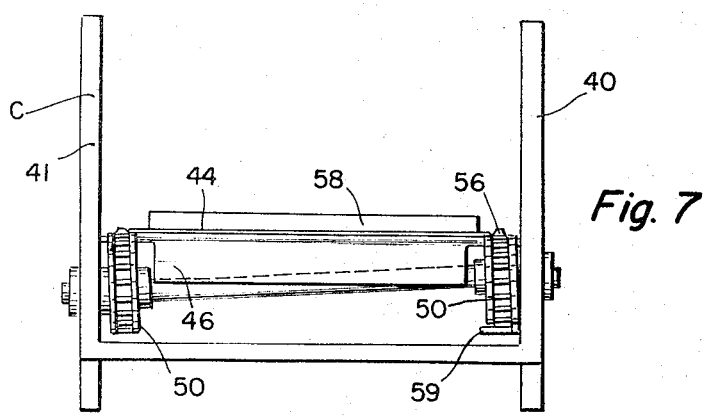
FIGURE 7 is an end elevational view of section C looking from the bottom in FIGURE 6.

The straight conveyor section D which is normally horizontally disposed, includes a supporting frame generally designated as 62 for the longitudinally extending, bale supporting rails 64 between which the links of the bale conveying chain 66 move after leaving the sprocket 14 to move the bales to the discharge point adjacent the source of power H (FIGURES 1 and 6).

It will now be apparent that the plural section conveyor comprising the present invention provides a simple, practical, highly efficient co-ordinated means for elevating bales up steep inclines and around turns in a novel manner such as to materially reduce the cost of the apparatus by eliminating the complexity usually characterizing known conveyors and by elevating bales positioned between the conveyor chains by means of flights spaced above the conveyor section bottom.

It is to be understood that the form of the invention herewith shown and described is to be taken as a preferred example of the same and that various changes in the shape, size and arrangement of parts may be resorted to without departure from the spirit of the invention or the scope of the subjoined claims.

I claim:

1. A conveyor for loading and elevating bales comprising, in combination, a first section for receiving bales to be elevated; a second section for elevating bales at any desired and steep angle of inclination having a pivotal connection with the discharge end of said first section; said sections having bottoms along which the bales are to be moved; a single pair of endless conveyor chains coextensive with said sections arranged at each side thereof and having the driving portions spaced above and parallel to said bottoms; bale moving flights arranged transversely of and connecting said chains and engageable with the bales at a point intermediate their height; power means for driving said chains to effect the loading and elevation of said bales; idler chain sprockets mounted on said pivotal connection between said sections and bearing against the upper side of said driving chain portions to enable free relative pivoting of said sections during operation and to position them for bale loading and elevating; and resiliently mounted guide rails mounted on the sides of said sections and overlapping at said pivotal connection and being engageable with the ends of the bales to retain them against the bottoms of said sections during their loading and elevation.

2. The combination recited in claim 1; and a bale-supporting plate hinged to the discharge end of said first section to conduct bales to the bottom of said second section by spanning the opening between the lower adjacent ends of said sections when angularly displaced during elevation of the bales.

3. The combination recited in claim 1; and chain supporting wear plates fixed to the loading end of said second section to conduct the return runs of said chains to said first section by spanning the opening between the lower adjacent ends of said sections when angularly displaced during elevation of the bales.

4. The combination recited in claim 2; and chain supporting wear plates fixed to the loading end of said second section to conduct the return runs of said chains to said first section by spanning said opening.

5. The combination recited in claim 1; and conveyor means pivotally connected to the upper end of said inclined second section for receiving the bales elevated thereby and including arcuate and straight sections for discharging the bales at a point out of axial alignment with said elevating section; and power means for driving said conveyor means.

References Cited

UNITED STATES PATENTS

| | | | |
|---|---|---|---|
| 2,457,407 | 12/1948 | Sebastian | 198—204 X |
| 2,551,427 | 5/1951 | Ellefson | 198—7 |
| 2,586,324 | 2/1952 | Graves | 214—83.26 |
| 2,855,091 | 10/1958 | Frandsen | 198—182 |
| 2,883,030 | 4/1959 | Saunders | 198—7 |
| 3,155,226 | 11/1964 | Beiler | 198—182 |
| 3,182,782 | 5/1965 | Beiler et al. | 198—171 X |

HUGO O. SCHULZ, *Primary Examiner.*

EVON C. BLUNK, *Examiner.*

R. J. HICKEY, *Assistant Examiner.*